US012024296B2

(12) United States Patent
Mansouri et al.

(10) Patent No.: US 12,024,296 B2
(45) Date of Patent: Jul. 2, 2024

(54) PASSENGER SEAT WITH NON-INTRUSIVE RECLINE

(71) Applicant: Safran Seats USA LLC, Gainesville, TX (US)

(72) Inventors: Reza Mansouri, Costa Mesa, CA (US); Romain Tranier, Costa Mesa, CA (US); Foek Le, Arlington, TX (US); Charles Michael Parker, Irvine, CA (US); Gokul Ramarathnam, Irvine, CA (US); Amen Omoragbon, Westminster, CA (US)

(73) Assignee: SAFRAN SEATS USA LLC, Gainesville, TX (US)

( * ) Notice: Subject to any disclaimer, the term of this patent is extended or adjusted under 35 U.S.C. 154(b) by 269 days.

(21) Appl. No.: 17/613,394

(22) PCT Filed: May 30, 2019

(86) PCT No.: PCT/US2019/034617
§ 371 (c)(1),
(2) Date: Nov. 22, 2021

(87) PCT Pub. No.: WO2020/242479
PCT Pub. Date: Dec. 3, 2020

(65) Prior Publication Data
US 2022/0250750 A1    Aug. 11, 2022

(51) Int. Cl.
*B60N 2/12* (2006.01)
*B64D 11/06* (2006.01)

(52) U.S. Cl.
CPC .............. *B64D 11/064* (2014.12); *B60N 2/12* (2013.01)

(58) Field of Classification Search
CPC .................................. B60N 2/12; B64D 11/064
(Continued)

(56) References Cited

U.S. PATENT DOCUMENTS

| 1,756,807 | A | * | 4/1930 | Black | B60N 2/067 |
| | | | | | 297/343 |
| 2,270,172 | A | * | 1/1942 | Ruegger | B60N 2/2209 |
| | | | | | 297/216.19 |

(Continued)

FOREIGN PATENT DOCUMENTS

| CN | 103068677 A | 4/2013 |
| CN | 104709121 A | 6/2015 |

(Continued)

OTHER PUBLICATIONS

International Patent Application No. PCT/US2019/034617, International Search Report and Written Opinion, dated Feb. 25, 2020.

(Continued)

*Primary Examiner* — Rodney B White
(74) *Attorney, Agent, or Firm* — Kilpatrick Townsend & Stockton LLP (57) ABSTRACT

Described are passenger seat reclining systems having a seat pan; a seat back fixed with respect to the seat pan; and at least one spreader. Motion track segments of the spreader may cause a particular recline motion. For example, the motion track segments may cause the seat body to rotate about an axis adjacent to the headrest during transition from an upright position to a reclined position of the passenger seat. Additionally or alternatively, the motion track segments may be configured such that the seat pan translates down and forward when the passenger seat transitions from an upright position to a reclined position, and such that the seat back is constrained to undergo less than less than 3 inches (7.62 cm) of rearward translation in recline travel when the passenger seat transitions from the upright position to the reclined position.

13 Claims, 3 Drawing Sheets

(58) Field of Classification Search
USPC .............. 297/316, 317, 322, 342, 325, 329
See application file for complete search history.

(56) References Cited

U.S. PATENT DOCUMENTS

| | | | | |
|---|---|---|---|---|
| 2,712,346 A * | 7/1955 | Sprinkle | ............... | B60N 2/1857 297/317 X |
| 2,725,921 A * | 12/1955 | Markin | ................ | B60N 2/2209 297/318 |
| 3,567,280 A * | 3/1971 | Bradhsaw | .......... | A47C 1/03294 297/322 X |
| 3,572,829 A * | 3/1971 | Malitte | .................. | B64D 11/06 297/317 |
| 3,998,291 A * | 12/1976 | Davis | ................ | B60N 2/42736 296/68.1 |
| 4,518,201 A * | 5/1985 | Wahlmann | ........... | B60N 2/2209 297/322 X |
| 5,110,182 A * | 5/1992 | Beauvais | .............. | B60R 22/195 297/216.19 |
| 5,125,598 A * | 6/1992 | Fox | ...................... | B60N 2/4242 244/122 R |
| 5,366,269 A * | 11/1994 | Beauvais | .............. | B60N 2/4214 297/216.19 |
| 5,437,494 A * | 8/1995 | Beauvais | ........... | B60N 2/42736 297/216.19 |
| 5,636,424 A * | 6/1997 | Singer | .................. | B60N 2/4221 297/216.19 |
| 5,647,628 A * | 7/1997 | Pires | .................. | B60N 2/42736 296/68.1 |
| 6,334,648 B1 * | 1/2002 | Girsberger | ......... | B60N 2/42736 297/322 X |
| 6,578,917 B1 * | 6/2003 | Aubert | ..................... | B60N 2/22 297/317 X |
| 6,641,214 B2 * | 11/2003 | Veneruso | .............. | B60N 2/0252 297/317 X |
| 6,739,661 B1 * | 5/2004 | Dukes | .................... | B60N 2/286 297/256.13 |
| 6,742,840 B2 | 6/2004 | Bentley | | |
| 7,108,326 B2 * | 9/2006 | Schurg | ............... | B64D 11/0638 297/317 X |
| 7,600,817 B2 * | 10/2009 | Kramer | .................. | A47C 1/023 297/354.13 X |
| 7,628,357 B2 * | 12/2009 | Mercier | ................. | B64D 25/04 297/216.17 |
| 7,637,571 B2 * | 12/2009 | Okano | ................. | B60N 2/1821 297/341 X |
| 7,744,155 B2 * | 6/2010 | List | .................... | B60N 2/42736 297/216.17 |
| 7,762,630 B2 * | 7/2010 | Ott | ....................... | B60N 2/1846 297/341 |
| 8,403,415 B2 * | 3/2013 | Lawson | ............... | B64D 11/064 297/322 X |
| 9,421,886 B2 * | 8/2016 | Cecinas | .............. | B64D 11/0689 |
| 9,434,277 B2 * | 9/2016 | Jerome | .................... | B60N 2/10 |
| 9,994,321 B2 * | 6/2018 | Murnan | ............ | B64D 11/0641 |
| 10,232,744 B2 * | 3/2019 | Meister | ............... | B64D 11/0642 |
| 10,442,330 B2 * | 10/2019 | Le | .......................... | B64D 11/0638 |
| 11,654,807 B2 * | 5/2023 | Le | ........................... | B60N 2/686 297/452.18 |
| 2002/0145319 A1 * | 10/2002 | Tsugimatsu | .......... | B60N 2/2875 297/256.13 |
| 2003/0111888 A1 | 6/2003 | Brennan | | |

FOREIGN PATENT DOCUMENTS

| | | | | |
|---|---|---|---|---|
| DE | 3822877 A1 * | 1/1990 | | |
| GB | 2216405 A * | 10/1989 | .......... | B60N 2/2821 |
| WO | 2015153840 A1 | 10/2015 | | |

OTHER PUBLICATIONS

China Patent Application No. 201980096942.5, Office Action, Apr. 14, 2023.
Europe Patent Application No. 19731489.1, Office Action (Communication pursuant to Article 94(3) EPC), May 30, 2023.
China Application No. 201980096942.5, Office Action, dated Oct. 31, 2023.

* cited by examiner

PASSENGER SEAT WITH NON-INTRUSIVE RECLINE

FIELD OF THE INVENTION

The field of the invention relates to reclinable passenger seats, and more particularly (although not necessarily exclusively) to assemblies that may be implemented to control motion paths of seat parts during seat recline in aircrafts or other passenger vehicles.

BACKGROUND

Passenger comfort can be an important consideration in carrier industries, particularly with air carriers, To this end, most seats in commercial passenger aircraft are able to recline, thereby providing a passenger some ability to adjust comfort. The recline motion can contribute to a passenger's comfort since the recline motion may influence both the passenger's posture and "living space" (e.g., amount of space between the passenger's seat and adjacent seats).

In a typical passenger aircraft seat, the recline motion allows the backrest to pivot backward, creating a 10-20 degree angle. This customarily causes 3-6 inches (7.62-15.24 cm) of flat recline travel (e.g., a horizontal distance between the rear-most portion of the top of the seat back in the fully reclined state and in the fully non-reclined or upright state). The flat recline travel of the seat back is typically accompanied by a forward shift of the seat pan by about 1-3 inches (2.54-7.62 cm) forward. Thus, a reclining passenger will typically perceive that reclining provides an increase in living space because the space between the passenger's face and the seat in front of the passenger is greater when the passenger's seat is reclined than when upright.

However, while reclining may provide a perceived increase in living space for the passenger initiating the recline, the seat back's 3-6 inches (7.62-15.24 cm) of flat recline travel may intrude on the living space of a passenger seated immediately behind. Thus, a passenger seated behind another may often be frustrated at the loss of living space sacrificed by the choice made by the passenger in front to recline.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat is provided and includes a seat pan, a seat back fixed with respect to the seat pan, and at least one spreader that can include two motion track segments. The two motion track segments can be configured such that the seat pan translates down and forward when the passenger seat transitions from an upright position to a reclined position and such that the seat back is constrained to undergo less than 3 inches (7.62 cm) of rearward translation in recline travel when the passenger seat transitions from the upright position to the reclined position.

In some embodiments, the seat back and the seat pan comprise a single load-bearing structure.

In some embodiments, the two motion track segments are configured such that the seat hack is constrained to undergo between zero and 3 inches (0.00-7.62 cm) of rearward translation in recline travel when the passenger seat transitions from the upright position to the reclined position.

In some embodiments, the two motion track segments are configured such that the seat back is constrained to undergo less than 1 inch (2.54 cm) of rearward translation in recline travel when the passenger seat transitions from the upright position to the reclined position.

In some embodiments, the two motion track segments are configured such that the seat back is constrained to undergo between zero and 1 inches (0.00-2.54 cm) of rearward translation in recline travel when the passenger seat transitions from the upright position to the reclined position.

In some embodiments, the two motion track segments are configured such that the seat back is constrained to move without rearward translation in recline travel when the passenger seat transitions from the upright position to the reclined position.

In some embodiments, the two motion track segments are configured such that a rearmost point of the seat back is constrained to move straight downward without forward or rearward translation in recline travel when the passenger seat transitions from the upright position to the reclined position.

In some embodiments, the passenger seat may further include a flexible bullnose affixed to a forward portion of the seat pan.

According to certain embodiments of the present invention, a spreader is provided for a passenger seat having a seat hack fixed relative to a seat pan. The spreader can include a body; a front motion track segment defined in a front portion of the body; and a rear motion track segment defined in a rear portion of the body. The front motion track segment and the rear motion track segment can be sized and arranged to engage the passenger seat so that the passenger seat's motion during transition from an upright position to a reclined position is constrained to include downward and forward translation of the seat pan and downward translation of the seat back without the seat back translating backward more than 3 inches (7.62 cm).

In some embodiments, the front motion track segment and the rear motion track segment correspond to indentations that are formed on an inside face of the body and do not penetrate through an outside face of the body.

In some embodiments, at least one of the front motion rack segment or the rear motion track segment is curved.

In some embodiments, the front motion track segment and the rear motion track segment are sized and arranged such that the seat back is constrained to move from a maximum upright position to a maximum reclined position in a manner that prevents the seat back from crossing a vertical reference plane that intersects a rear-most point on the seat back in the maximum upright position.

In some embodiments, the front motion track segment and the rear motion track segment are sized and arranged to cause a reclining motion in which the passenger seat rotates about an axis located adjacent a headrest of the passenger seat.

According to certain embodiments of the present invention, a passenger seat is provided and includes a seat body and at least one spreader. The seat body can include a seat pan and a seat back. The seat back can be fixed with respect to the seat pan and have a headrest located at or adjacent an upper end of the seat back. The at least one spreader can include two motion track segments sized and arranged to engage the seat body so that the seat body rotates about an axis adjacent to the headrest during transition from an upright position to a reclined position of the passenger seat.

In some embodiments, the seat hack is configured to receive a passenger and to support shoulders of the passenger at a shoulder level, and the axis is positioned above the shoulder level.

In some embodiments, the axis is positioned at or below a base of the headrest.

In some embodiments, the axis is located coinciding with a rearmost part of the passenger seat.

In some embodiments, the two motion track segments are configured such that the seat pan translates down and forward when the passenger seat transitions from the upright position to the reclined position.

In some embodiments, the two motion track segments are further configured such that the seat back is constrained to undergo less than less than 3 inches (7.62 cm) of rearward translation in recline travel when the passenger seat transitions from h upright position to the reclined position.

In some embodiments, the two motion rack segments are further configured such that the axis translates downward when the passenger seat transitions from the upright position to the reclined position.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide reclining systems for passenger seats. While the reclining systems are discussed for use with aircraft seats, they are by no means so limited. Rather, embodiments of the reclining systems may be used in passenger seats or other seats of any type or otherwise as desired. For example, embodiments may be used on trains, buses, movie theaters, student seating, or any other instance when reclining capability for a seat may be useful.

In various embodiments, the reclining systems can allow reclining of a passenger seat in a manner that is non-intrusive to a passenger seated directly behind the seat. For example, a body of the seat formed by the seat back fixed relative to the seat pan may swing forward and/or downward during recline, e.g., so that a rearmost portion of the seat translates directly downward or otherwise does not pivot at all toward the passenger seated behind. Thus, for such a seat installed into a pre-existing row that is constrained to a particular amount of space between seats, the reclining motion may in effect allow the reclining passenger to reduce or eliminate rearward reclining travel in exchange for forward motion affecting his or her own legroom without affecting the head-level living space of the passenger behind. Yet, the reclining passenger may also be untroubled by the additional forward motion since the body of the seat being formed by the seat back fixed relative to the seat pan may cause the seat during recline to cradle the passenger in a manner that at least partially lifts a forward portion of the passenger's legs and reduces an overall horizontal distance needed to accommodate the passenger's legs. Accordingly, a passenger choosing to recline may do so with without significant sacrifice of the head-level living space for another passenger behind and also without experiencing a significant sacrifice in his or her own legroom. In various examples, the rearmost portion of the seat rather than translating directly downward may still exhibit some minor degree of rearward recline travel, yet a passenger behind the seat may still deem the recline to be non-intrusive on account of that rearward recline travel amount being less than the 3 inches (7.62 cm) already accepted as the low end of the norm for rearward recline travel in passenger seats.

Figure 1:
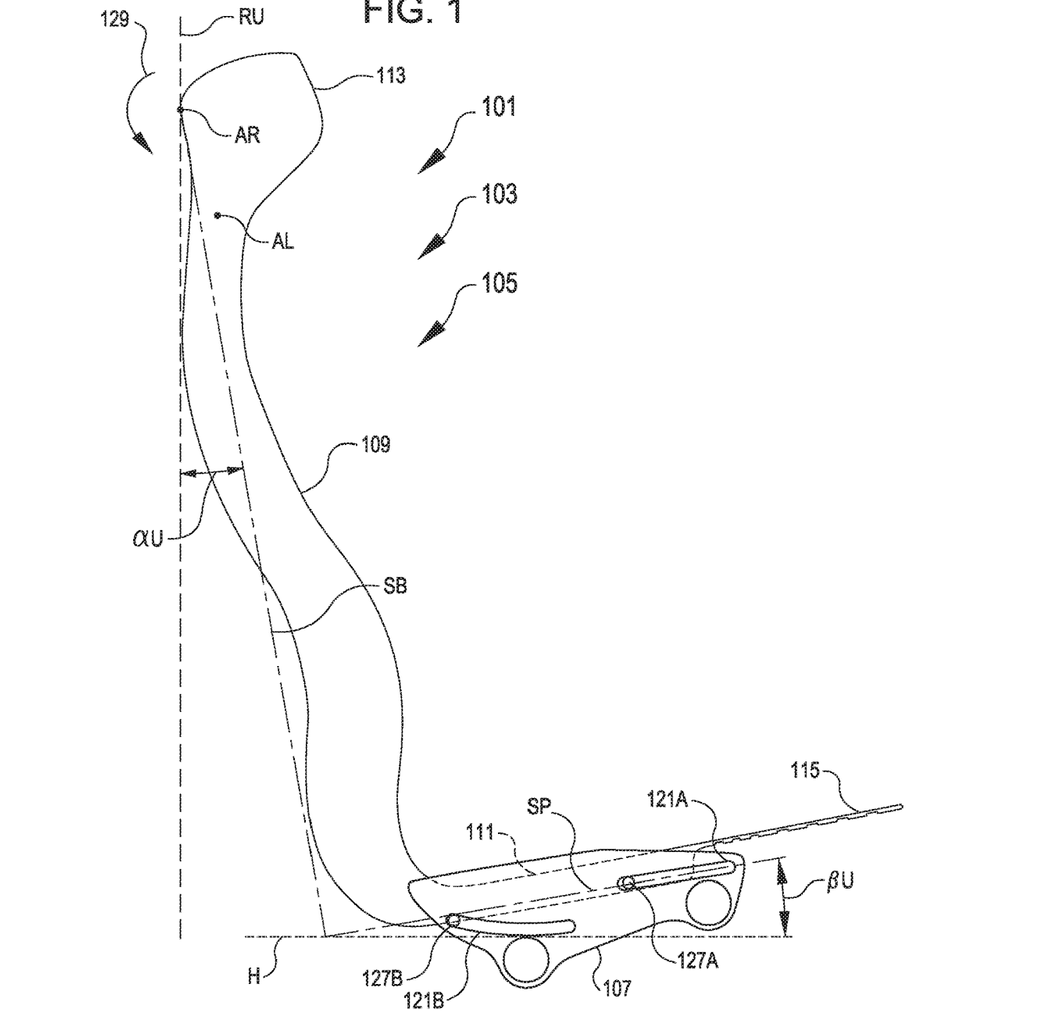
FIG. 1 is a side view of an example of a passenger seat in an upright position, according to certain embodiments of the present invention.
Figure 2:
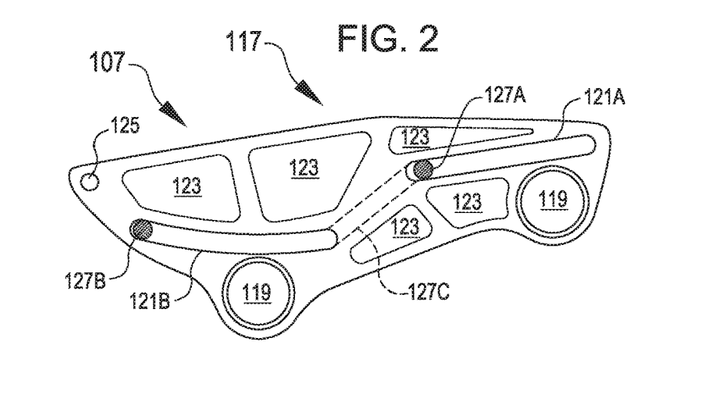
FIG. 2 is a side view showing a spreader that may be utilized with the passenger seat of FIG. 1.
Figure 3:
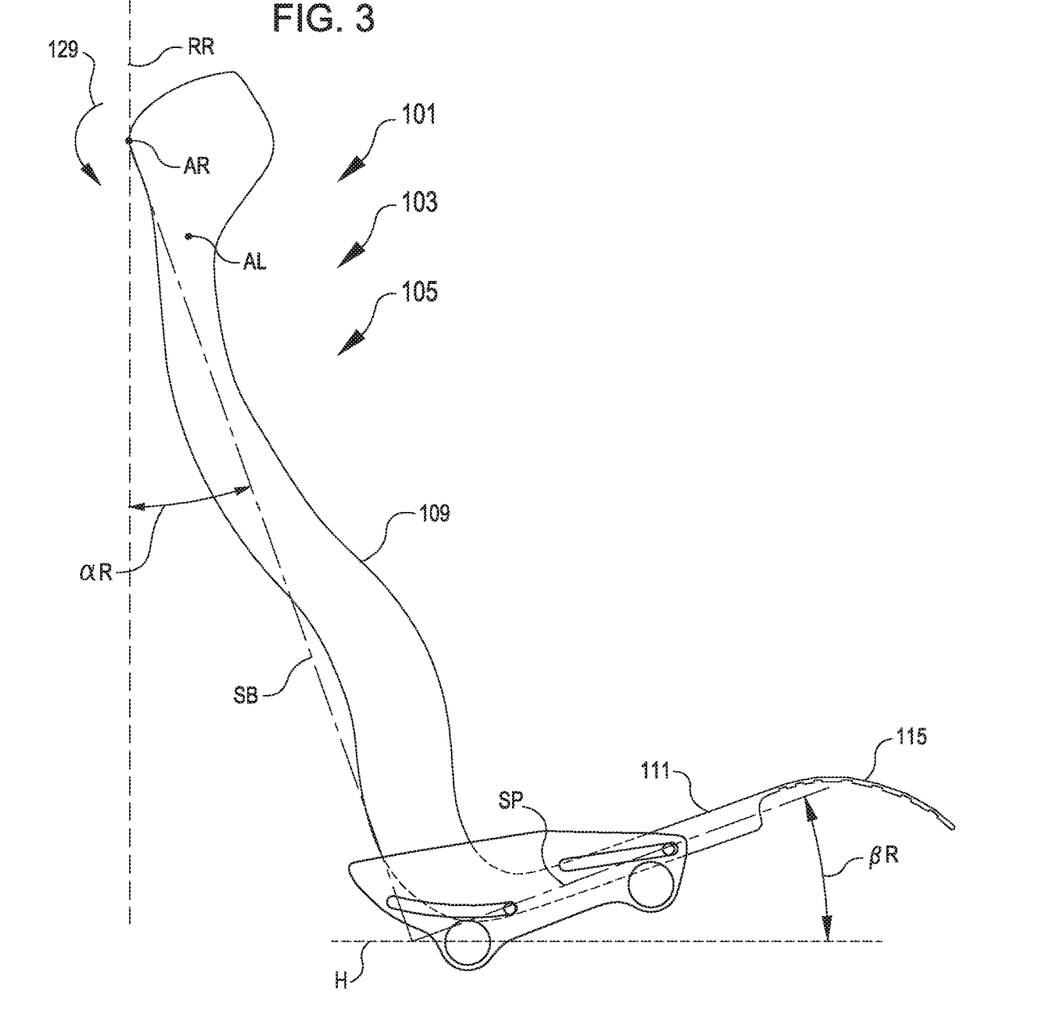
FIG. 3 is a side view of the passenger seat of FIG. 1 in a reclined position, according to certain embodiments of the present invention.
Figure 4:
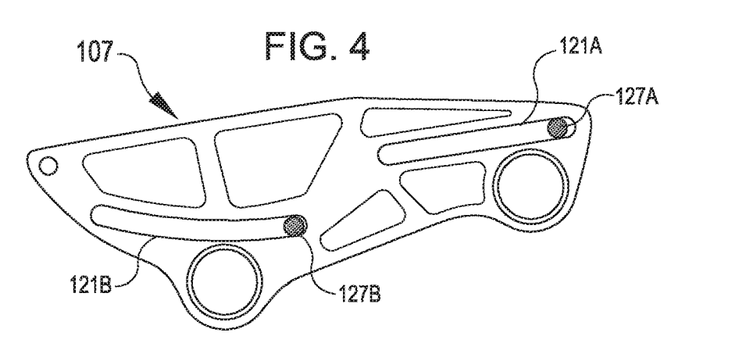
FIG. 4 is a side view of the spreader of FIG. 2 showing a configuration that may facilitate the reclined position of the passenger seat shown in FIG. 3.

According to certain embodiments of the present invention, as shown in FIGS. 1-5, a reclining system 101 can be implemented relative to a passenger seat 103 and include a seat body 105 and at least one spreader 107. The reclining system 101 may allow the passenger seat 103 to be reclinable. For example, the at least one spreader 107 may support the seat body 105 and facilitate, define, and/or constrain motion of the seat body 105 between different positions within a range of recline motion, e.g., between a fully upright or maximum upright position (such as depicted in FIG. 1) and a fully reclined or maximum reclined position (such as depicted in FIG. 3).

The seat body 105 can include a seat back 109 and a seat pan 111. The seat back 109 and the seat pan 111 may be fixed relative to one another. For example, the seat back 109 and the seat pan 111 may be single load-bearing structure. The seat pan 111 being fixed relative to the seat back 109 may be useful in allowing the seat body 105 to cradle a passenger during recline in the manner described herein.

Respective elements of the seat body 105 may include suitable materials and/or features to facilitate various functions. For example, in various embodiments, the seat pan iii and the front of the seat back 109 include non-rigid or pliable materials (e.g., fabric, textiles, foam, or other cushioning material) for the comfort of passengers when supported in the passenger seat 103. Other more rigid materials may also be included, such as to reinforce pliable materials, or to provide components for other functions. For example, the seat back 109 on a rear side may include a shroud that is formed from rigid material and that is coupled with cushioning material of the seat back 109. Suitable examples of rigid material that may be used for the shroud and/or other components described herein include, but are not limited to, aluminum, stainless steel, aramid fibers, polycarbonate, polypropylene, other metallic materials, composite materials, or other similar materials.

The seat back 109 can include suitable contouring or other features for facilitating passenger comfort. For example, the seat back 109 may include a headrest 113. The headrest may be of a fixed shape or may be adjustable to accommodate differences in preference and/or sizes of passengers.

The seat pan 111 can include suitable contouring or other features for facilitating passenger comfort. For example, in FIG. 1, the seat pan 111 is shown including or coupled with a flexible bullnose 115 at a forward end of the seat pan 111. The bullnose 115 may include a flexible member comprised of a elastomer, polymer, rubber, silicone, spring metal, or other material, which may deflect and repeatedly return to its original position or otherwise provide adequate flexibility and resilience to avoid permanent deformation. In various embodiments, the bullnose 115 may move between a static position (e.g., FIG. 1) and a flexed position (e.g., FIG. 3) along a motion path. In use, the bullnose 115 may provide varying support to the thighs of a passenger, particularly when the passenger reclines the passenger seat 103. For example, the bullnose 115 may flex between the static position and the flexed position to provide support and comfort to the passenger as the passenger moves, adjusts his or her seat, or changes position. In certain embodiments, the bullnose 115 may be adapted to flex so that a passenger's feet remain in contact with the ground even when the seat 103 is reclined and the forward portion of the seat pan 111 may be angled away from the passenger compartment floor. The bullnose 115, similar to the seat pan 111, may be upholstered with additional fabric, cushioning, or other supports to provide a more aesthetically pleasing look and feel, and to improve passenger comfort.

The at least one spreader 107 in use may support the seat body 105. The at least one spreader 107 may correspond to multiple spreaders 107 (such as in an arrangement that includes one the left side and another on the right side of a passenger seat 103), although for simplicity herein, discussion will primarily focus on a single spreader 107.

The spreader 107 may separate the passenger seat 103 from a laterally adjacent seat, such as to the left or right. The spreader 107 can provide the attachment and structural connection between the seat body 105 and seat tubes (not shown) or other structure of the vehicle or mode of transport. Although not shown, the spreader 107 may have a portion (e.g., L-shaped or other shape) that extends above the seat pan 111 to provide structure for the armrests of the passenger seat 103. In some examples, armrests may be instead directly mounted to the seat back 109. The spreader 107 may provide structure to hold other parts of the seat, such as the seat back 109, seat pan 111, seat body 105, armrests, and/or seatbelt attachment.

In FIG. 1, the spreader 107 is depicted in place relative to the seat body 105, while in FIG. 2, the spreader 107 is shown in isolation and with additional features shown. As may be best appreciated with reference to FIG. 2, the spreader 107 can include a spreader body 117. In various embodiments, the spreader body 117 is formed of a single piece of material with appropriate cut-outs or other features formed therein, although the spreader body 117 may be formed of any combination of materials or parts by any suitable construction process. Features shown formed in the spreader body 117 in FIG. 2 include seat tube apertures 119, motion track segments 121 (e.g., front motion track segment 121A and rear motion track segment 121B), light-weighting openings 123, and a seatbelt attachment point 125, although different combinations and/or configurations than the specific arrangement shown in FIG. 2 are also possible. For example, the seatbelt attachment point may be located on the seat body 105 in some examples.

As noted, motion track segments 121 can be provided by the at least one spreader 107. For example, in FIG. 2, two motion track segments 121 are shown in one spreader 107, with the front motion track segment 121A in a front portion of the spreader body 117 and the rear motion track segment 121B in a rear portion of the spreader body 117. In some embodiments, motion track segments 121 may be distributed among different spreaders 107, for example, with one of the front motion track segment 121A or the rear motion track segment 121B being in a spreader 107 on a left side of the passenger seat 103, and the other being in a spreader 107 on the a right side of the passenger seat 103.

The motion track segments 121 may be configured to accept rollers or other sliding members 127 from the seat body 105. In certain embodiments, the motion track segments 121 will be disposed on the inside surface of the spreader 107 to eliminate or reduce potential pinch points. For example, the front motion track segment 121A and the rear motion track segment 1213 may correspond to indentations that are formed on an inside face of the spreader body 117 and do not penetrate through an outside face of the spreader body 117 or through a cover that may be joined to or for part of the spreader body 117.

Referring again to FIG. 1, the seat body 105 may be coupled with the spreader 107 by rollers or other sliding members 127 received in the motion track segments 121. For example, the sliding members 127 may extend out from the seat body 105 and into the motion track segments 121. The sliding members 127 may be capable of moving within the motion track segments 121 to allow the seat body 105 to move relative to the spreader 107. For example, referring first FIG. 2, a particular sliding member 127A positioned at the rearward end of its respective motion track segment 121A when the seat body 105 is in a maximum upright position may move along the motion track segment 121A for reclining until reaching a point (e.g., shown in FIG. 4) of being positioned at the forward end of its motion track segment 121A, which may constrain the seat body 105 from moving past a maximum reclined position. When returning the seat body 105 toward upright, the sliding member 127A may move along its motion track segment 121A in the opposite direction and reach the rearward end of its motion track segment 121A to constrain the seat body 105 from moving past a maximum upright position.

The motion track segments 121 may constrain the motion of the seat body 105 along a certain path of travel and/or between particular points. For example, whereas use of only a single sliding member 127 in a single motion track segment 121 might allow rotation about the respective sliding member 127 during movement along the motion track segment 121, including two sliding members 127 within two motion track segments 121 may restrict or constrain two degrees of freedom of the seat body 105 and allow one degree of freedom to allow the seat body 105 to move in a stable predetermined path for recline. Moreover, although the motion track segments 121 are depicted in FIG. 2 as distinct grooves that are unconnected to one another, in some embodiments, the motion track segments 121 may be connected to one another by an intervening portion (such as illustrated in dashed lines at 127C) or otherwise form sub-portions of a larger groove.

The motion track segments 121 may be configured to displace the passenger seat 103 in a rocking or cradling motion in which the passenger seat 103 is displaced downward and forward for recline. Although the front motion track segment 121A and the rear motion track segment 121B are respectively depicted as straight and curved, any suitable combination of straight or curved shapes may be used to obtain a desired motion profile between endpoints of the recline motion. While unpowered recline of the passenger seat 103 may be preferable in certain applications, in some embodiments the rocking or cradling motion of the passenger seat may be assisted or accomplished through the use of springs, gas springs, or electric motors.

As noted, the spreader 107 may constrain the seat body 105 to certain types of motion. For ease of explanation of various options of such motion, various reference lines are shown throughout the figures.

For example, for the passenger seat 103 in the upright state depicted in in FIG. 1, the reference line RU is aligned with a vertical direction and coincides with a rearmost portion of the seat 103 in the upright position. The reference line SB represents a straight line aligned along the seat back 109 and may be useful for identifying an upright seat back angle αU at which the seat back 109 is aligned in the upright position relative to the vertical direction represented by RU. Similarly, the reference line SP represents a straight line aliened along the seat pan 111 and may be useful for identifying an upright seat pan angle βU at which the seat pan 11 is aligned in the upright position relative to the horizontal direction H.

Similar reference lines are identified for the passenger seat 103 in the reclined state depicted in FIG. 3. For example, in FIG. 3, the reference line RR is aligned with a vertical direction and coincides with a rearmost portion of the seat 103 in the reclined position. The reference line SB again represents a straight line aligned along the seat back 109 and may be useful for identifying a reclined seat back angle αR at which the seat back 109 is aligned in the reclined position relative to the vertical direction represented by RR. Similarly, the reference line SP again represents a straight line aligned along the seat pan 111 and may be useful for identifying a reclined seat pan angle βR at which the seat pan 11 is aligned in the reclined position relative to the horizontal direction H.

Figure 5:
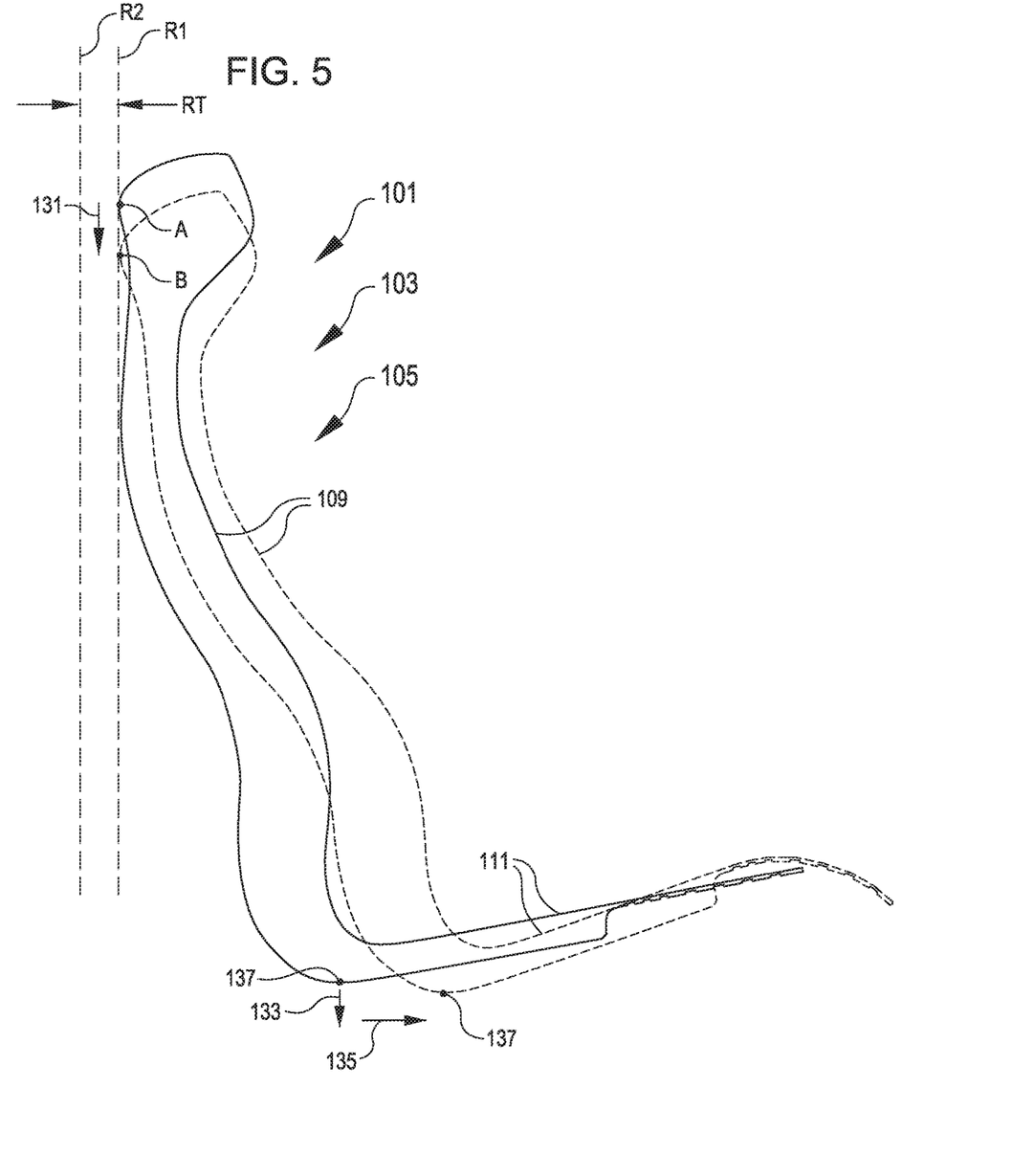
FIG. 5 is a side view showing a comparison overlay of the reclined positions of the passenger seat from FIGS. 1 and 3 according to certain embodiments of the present invention.

For comparison, FIG. 5 shows a first vertical reference line R1 and a second vertical reference line R2. A distance between the first vertical reference line R1 and the second vertical reference line R2 is graphically identified as RT in FIG. 5 and may correspond to an amount of flat recline travel. However, it is also to be noted that although the first vertical reference line R1 and the second vertical reference line R2 are shown spaced apart in FIG. 5 (e.g., corresponding to a non-zero amount of recline travel RT), this is for ease of viewing the relative location of the relevant dimension and does not preclude the possibility of the recline travel RT having a value of zero. For example, on the one hand, in some embodiments, FIG. 5's vertical reference lines R1 and R2 may respectively correspond to the vertical reference lines RU and RR of FIG. 1 and FIG. 3 such that there is a non-zero recline travel RT distance between the rearmost portion of the seat 103 in the upright position and the reclined position. On the other hand, in some embodiments, the vertical reference lines RU and RR of FIG. 1 and FIG. 3 may each map to FIG. 5's vertical reference line R1 such that there is zero recline travel RT distance between the rearmost portion of the seat 103 in the upright position and the reclined position.

In some embodiments, the motion track segments 121 (e.g., the front motion track segment 121A and the rear motion track segment 121B) are sized and arranged to cause a reclining motion in which the passenger seat 103 rotates e.g., as illustrated by arrow 129) about an axis AR located adjacent the headrest 113 of the passenger seat 103. The portion of the seat body 105 that is below the axis AR may accordingly rotate away from vertical, for example, such that the reclined seat hack angle αR in FIG. 3 is greater than the upright seat hack angle αU in FIG. 1. Such rotation may also cause a forward end of seat pan 111 to rotate upward from horizontal for example, such that the reclined seat pan angle βR in FIG. 3 is greater the upright seat pan angle βU in FIG. 3. Rotating the seat pan 111 upward can reduce a horizontal distance occupied by the legs of the passenger, and/or cause the bullnose 115 to flex downward, if present.

In FIGS. 1 and 3, the axis AR is depicted located at a position coinciding with a rearmost part of the passenger seat 103. Such positioning may allow the seat 103 to recline without any portion of the seat 103 moving rearwardly into living space behind the seat 103. In some embodiments, the location of the axis AR may be varied without incurring an intrusive amount of rearward motion of the seat 103. One such alternate location AL for the axis AR is shown in FIGS. 1 and 3, although alternate placement is not limited to the depicted alternate location AL. In some embodiments, the axis AR is positioned at or below a base of the headrest 113. In some embodiments, the seat back 109 is configured to receive a passenger and to support shoulders of the passenger at a shoulder level, and the axis AR is positioned above that shoulder level.

In some embodiments, the axis AR may undergo a vertical translation downward as part of the recline motion from the upright position to the reclined position. For example, as shown in FIG. 5, this may correspond to a downward translation represented by downward arrow 131, such as from reference point A in the upright position to reference point B in the reclined position.

In some embodiments, the motion track segments 121 (e.g., the front motion track segment 121A and the rear motion track segment 121B) are sized and arranged such that the seat back 109 is constrained to move from a maximum upright position (e.g., in solid lines in FIG. 5) to a maximum reclined position (e.g., in dashed lines in FIG. 5) in a manner that prevents the seat back 109 from crossing a vertical reference plane (e.g., R1) that intersects a rearmost point on the seat back 109 in the maximum upright position.

In some embodiments, a portion of the seat back 109 is permitted to cross the vertical reference plane e.g., R1) that intersects a rear-most point on the seat back 109 in the maximum upright position. For example, with reference to FIG. 5, the seat 103 may be allowed to pivot backwards so that the rearmost portion of the seat 103 in the maximum reclined position is coincident with a second reference plane R2 that differs from and is spaced apart by a recline travel distance RT from a first reference plane R1 that intersects a rear-most point on the seat back 109 in the maximum upright position. A variety of different ranges may be non-intrusive to a passenger and/or provide other advantages.

For example, in some embodiments, the seat back 109 is constrained to undergo less than 3 inches (7.62 cm) of rearward translation in recline travel RT when the passenger seat transitions from the upright position to the reclined position. Such range may be advantageous in that it may be deemed to be non-intrusive on account of being less than the 3 inches (7.62 cm) already accepted as the low end of the norm for rearward recline travel in passenger seats.

In some embodiments, the seat back 109 is constrained to undergo between zero and 3 inches (0.00-7.62 cm) of rearward translation in recline travel RT. Such range may have the added benefit of preventing the reclining passenger from having the seat back 109 move forward in a manner that reduces head-level living space.

In some embodiments, the seat back 109 is constrained to undergo less than 1 inch (2.54 cm) of rearward translation in recline travel RT. Such range may be advantageous in that it may seem a negligible amount to a passenger seated behind.

In some embodiments, the seat back 109 is constrained to undergo between zero and 1 inches (0.00-2.54 cm) of rearward translation in recline travel RT. Such range may have the added benefit of preventing the reclining passenger from losing head-level living space from reclining.

In some embodiments, the seat back 109 is constrained to move without rearward translation in recline travel RT. Such motion may have the benefit of allowing a reclining passenger to recline without sacrificing any head-level living space for another passenger seated behind.

In some embodiments, the seat back 109 is constrained to move without rearward or forward translation in recline travel RT. Such motion may allow the seat 103 to recline without negatively impacting a forward or backward amount of head-level living space for either the reclining passenger or a passenger seated directly behind.

In some embodiments, the rearmost portion of the seat back 109 is additionally or alternatively constrained to move straight downward without forward or rearward translation in recline travel when the passenger seat 103 transitions from the upright position to the reclined position. Such motion may allow the seat pan 111 to tilt up and facilitate a rocking or cradling motion of the seat 103 without negatively impacting a forward or backward amount of head-level living space for either the reclining passenger or a passenger seated directly behind.

In some embodiments, the motion track segments 121 (e.g., the front motion track segment 121A and the rear motion track segment 121B) are sized and arranged to cause a reclining motion in which the passenger seat 103 undergoes motion that may be recognized by respective motion of sub-components. For example, the passenger seat 103 transitioning from the upright position to the reclined position may cause the passenger seat 103 to move so that the seat pan 111 translates down and forward (e.g., such as indicated in FIG. 5 by downward arrow 133 and leftward arrow 135 relative to a reference point 137 shown on both the upright position of the seat body 105 in solid lines and the reclined position of the seat body 105 in dashed lines). The passenger seat 103 further may move so that the seat back 109 is constrained to undergo less than a particular threshold described herein of rearward translation in recline travel RT when the passenger seat 103 transitions from the upright position to the reclined position. The passenger seat 103 further may move so that the seat back 109 moves at least partially downward (e.g., as illustrated by downward arrow 131) when the passenger seat 103 transitions from the upright position to the reclined position.

In the following, further examples are described to facilitate the understanding of the invention:

Example 1. A passenger seat (which may include features of any of the preceding or subsequent examples), comprising:
  a seat pan;
  a seat back fixed with respect to the seat pan; and
  at least one spreader comprising two motion track segments configured such that:
    the seat pan translates down and forward when the passenger seat transitions from an upright position to a reclined position; and
    the seat back is constrained to undergo less than 3 inches (7.62 cm) of rearward translation in recline travel when the passenger seat transitions from the upright position to the reclined position.

Example 2. The passenger seat of any of the preceding or subsequent examples, wherein the seat back and the seat pan comprise a single load-bearing structure.

Example 3. The passenger seat of any of the preceding or subsequent examples, wherein the two motion track segments are configured such that the seat back is constrained to undergo between zero and 3 inches (0.00-7.62 cm) of rearward translation in recline travel when the passenger seat transitions from the upright position to the reclined position.

Example 4. The passenger seat of any of the preceding or subsequent examples, wherein the two motion track segments are configured such that the seat back is constrained to undergo less than 1 inch (2.54 cm) of rearward translation in recline travel when the passenger seat transitions from the upright position to the reclined position.

Example 5. The passenger seat of any of the preceding or subsequent examples, wherein the two motion track segments are configured such that the seat back is constrained to undergo between zero and 1 inches (0.00-2.54 cm) of rearward translation in recline travel when the passenger seat transitions from the upright position to the reclined position.

Example 6. The passenger seat of any of the preceding or subsequent examples, wherein the two motion track segments are configured such that the seat back is constrained to move without rearward translation in recline travel when the passenger seat transitions from the upright position to the reclined position.

Example 7. The passenger seat of any of the preceding or subsequent examples, wherein the two motion track segments are configured such that a rearmost point of the seat back is constrained to move straight downward without forward or rearward translation in recline travel when the passenger seat transitions from the upright position to the reclined position.

Example 8. The passenger seat of any of the preceding or subsequent examples, further comprising a flexible bullnose affixed to a forward portion of the seat pan.

Example 9. A spreader for a passenger seat having a seat back fixed relative to a seat pan, the spreader (which may include features of any of the preceding or subsequent examples) comprising:
  a body;
  a front motion track segment defined in a front portion of the body; and
  a rear motion track segment defined in a rear portion of the body, wherein the front motion track segment and the rear motion track segment are sized and arranged to engage the passenger seat so that the passenger seals motion during transition from an upright position to a reclined position is constrained to include downward and forward translation of the seat pan and downward translation of the seat back without the seat back translating backward more than 3 inches (7.62 cm).

Example 10. The spreader of any of the preceding or subsequent examples, wherein the front motion track segment and the rear motion track segment correspond to indentations that are formed on an inside face of the body and do not penetrate through an outside face of the body.

Example 11. The spreader of any of the preceding or subsequent examples, wherein at least one of the front motion track segment or the rear motion track segment is curved.

Example 12. The spreader of any of the preceding or subsequent examples, Wherein the front motion track segment and the rear motion track segment are sized and arranged such that the seat back is constrained to move from a maximum upright position to a maximum reclined position in a manner that prevents the seat back from crossing a vertical reference plane that intersects a rear-most point on the seat back in the maximum upright position.

Example 13. The spreader of any of the preceding or subsequent examples, wherein the front motion track segment and the rear motion track segment are sized and arranged to cause a reclining motion in which the passenger seat rotates about an axis located adjacent a headrest of the passenger seat.

Example 14. A passenger seat (which may include features of any of the preceding or subsequent examples comprising:
a seat body comprising:
 a seat pan; and
 a seat back fixed with respect to the seat pan and having a headrest located at or adjacent an upper end of the seat back; and
at least one spreader comprising two motion track segments sized and arranged to engage the seat body so that the seat body rotates about an axis adjacent to the headrest during transition from an upright position to a reclined position of the passenger seat.

Example 15. The passenger seat of any of the preceding or subsequent examples, wherein the seat back is configured to receive a passenger and to support shoulders of the passenger at a shoulder level, and wherein the axis is positioned above the shoulder level.

Example 16. The passenger seat of any of the preceding or subsequent examples, wherein the axis is positioned at or below a base of the headrest.

Example 17. The passenger seat of any of the preceding or subsequent examples, wherein the axis is located coinciding with a rearmost part of the passenger seat.

Example 18. The passenger seat of any of the preceding or subsequent examples, wherein the two motion track segments are configured such that:
the seat pan translates down and forward when the passenger seat transitions from the upright position to the reclined position.

Example 19. The passenger seat of any of the preceding or subsequent examples, wherein the two motion track segments are further configured such that:
the seat back is constrained to undergo less than 3 inches (7.62 cm) of rearward translation in recline travel when the passenger seat transitions from the upright position to the reclined position.

Example 20. The passenger seat of any of the preceding or subsequent examples, wherein the two motion track segments are further configured such that:
the axis translates downward when the passenger seat transitions from the upright position to the reclined position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat, comprising:
a seat body formed by a seat back fixed relative to a seat pan; and
at least one spreader comprising two motion track segments configured to constrain movement of the seat body such that:
 the seat body swings forward relative to the spreader when the passenger seat transitions from an upright position to a reclined position;
 the seat pan at a reference point of the seat pan translates down and forward when the passenger seat transitions from an upright position to a reclined position; and
 the seat back at a rearmost part of the seat back is constrained to move without rearward translation in recline travel when the passenger seat transitions from the upright position to the reclined position,
wherein the two motion track segments includes a front motion track and a rear motion track, and
wherein the transition from the upright position to the reclined position is constrained to include:
 downward and forward translation of the seat pan;
 an increase in an angle of the seat back relative to vertical; and
 downward translation of the seat back without the seat back translating backward.

2. The passenger seat of claim 1, wherein the seat back and the seat pan comprise a single load-bearing structure.

3. The passenger seat of claim 1, further comprising a flexible bullnose affixed to a forward portion of the seat pan.

4. A spreader for a passenger seat having a seat back fixed relative to
a seat pan, the spreader comprising:
a body;
a front motion track segment defined in a front portion of the body; and
a rear motion track segment defined in a rear portion of the body, wherein the front motion track segment and the rear motion track segment are sized and arranged to engage the passenger seat so that the passenger seat swings relative to the spreader such that passenger seat's motion during transition from an upright position to a reclined position is constrained to include:
 downward and forward translation of the seat pan;
 an increase in an angle of the seat back relative to vertical; and
 downward translation of the seat back without the seat back translating backward.

5. The spreader of claim 4, wherein the front motion track segment and the rear motion track segment correspond to indentations that are formed on an inside face of the body and do not penetrate through an outside face of the body.

6. The spreader of claim 4, wherein at least one of the front motion track segment or the rear motion track segment is curved.

7. The spreader of claim 4, wherein the front motion track segment and the rear motion track segment are sized and arranged such that the seat back is constrained to move from a maximum upright position to a maximum reclined position in a manner that prevents the seat back from crossing a vertical reference plane that intersects a rear-most point on the seat back in the maximum upright position.

8. The spreader of claim 4, wherein the front motion track segment and the rear motion track segment are sized and arranged to cause a reclining motion in which the passenger seat rotates relative to the spreader and about an axis coinciding with a rearmost part of the passenger seat.

9. A passenger seat, comprising:
   a seat body comprising:
      a seat pan; and
      a seat back fixed with respect to the seat pan and having a headrest located at or adjacent an upper end of the seat back; and
   at least one spreader comprising two motion track segments sized and arranged to engage the seat body so that the seat body rotates relative to the spreader about an axis adjacent to the headrest during transition from an upright position to a reclined position of the passenger seat,
   wherein the two motion track segments includes a front motion track and a rear motion track, and
   wherein the transition from the upright position to the reclined position is constrained to include:
      downward and forward translation of the seat pan;
      an increase in an angle of the seat back relative to vertical; and
      downward translation of the seat back without the seat back translating backward.

10. The passenger seat of claim 9, wherein the seat back is configured to receive a passenger and to support shoulders of the passenger at a shoulder level, and wherein the axis is positioned above the shoulder level.

11. The passenger seat of claim 9, wherein the axis is positioned at or below a base of the headrest.

12. The passenger seat of claim 9, wherein the axis is located coinciding with a rearmost part of the passenger seat.

13. The passenger seat of claim 9, wherein the two motion track segments are further configured such that:
   the axis translates downward when the passenger seat transitions from the upright position to the reclined position.

* * * * *